United States Patent
Ouellette et al.

(10) Patent No.: US 12,221,230 B2
(45) Date of Patent: Feb. 11, 2025

(54) APPARATUS AND METHOD FOR ASSISTING WITH FUNCTIONAL TESTING OF AIRCRAFT SYSTEMS

(71) Applicant: BOMBARDIER INC., Dorval (CA)

(72) Inventors: Benoit Ouellette, Montreal (CA); Joseph Patrick Etienne Cote, Kirkland (CA)

(73) Assignee: BOMBARDIER INC., Dorval (CA)

( * ) Notice: Subject to any disclaimer, the term of this patent is extended or adjusted under 35 U.S.C. 154(b) by 196 days.

(21) Appl. No.: 16/754,812

(22) PCT Filed: Oct. 10, 2018

(86) PCT No.: PCT/CA2018/051275
§ 371 (c)(1),
(2) Date: Apr. 9, 2020

(87) PCT Pub. No.: WO2019/071344
PCT Pub. Date: Apr. 18, 2019

(65) Prior Publication Data
US 2021/0188462 A1    Jun. 24, 2021

Related U.S. Application Data

(60) Provisional application No. 62/570,961, filed on Oct. 11, 2017.

(51) Int. Cl.
*B64F 5/60*     (2017.01)
*B64D 45/00*    (2006.01)
*G07C 5/08*     (2006.01)

(52) U.S. Cl.
CPC ............... *B64F 5/60* (2017.01); *B64D 45/00* (2013.01); *G07C 5/0808* (2013.01); *G07C 5/0825* (2013.01); *B64D 2045/0085* (2013.01)

(58) Field of Classification Search
None
See application file for complete search history.

(56) References Cited

U.S. PATENT DOCUMENTS 7,421,319 B2   9/2008  Stefani
9,174,725 B2  11/2015  Porez et al.
(Continued)

FOREIGN PATENT DOCUMENTS

WO    2015198216 A1    12/2015

OTHER PUBLICATIONS

International Searching Authority, International Search Report and Written Opinion re: International Application No. PCT/CA2018/051275, Jan. 24, 2019.

*Primary Examiner* — James J Lee
*Assistant Examiner* — Wenyuan Yang
(74) *Attorney, Agent, or Firm* — Norton Rose Fulbright Canada LLP

(57) ABSTRACT

Apparatus and methods for assisting a flight crew with (e.g., pre-flight) functional testing of aircraft systems are disclosed. An aircraft condition can be used to select one or more functional tests that are applicable based on the aircraft condition. The aircraft condition can be used to initiate the execution of the one or more applicable selected functional tests. The aircraft condition can also be used to identify the one or more functional tests that are applicable on a display device so as to guide the flight crew during the execution of the functional tests.

19 Claims, 9 Drawing Sheets

(56) References Cited

U.S. PATENT DOCUMENTS

| | | | |
|---|---|---|---|
| 9,410,819 B2 | 8/2016 | Williams | |
| 9,424,754 B2 | 8/2016 | Srivastav et al. | |
| 9,561,866 B2 | 2/2017 | Williams et al. | |
| 10,088,843 B1* | 10/2018 | Radack | G05D 1/0055 |
| 2002/0138184 A1* | 9/2002 | Kipersztok | G05B 23/0278 |
| | | | 701/32.9 |
| 2006/0030981 A1* | 2/2006 | Robb | G07C 5/0816 |
| | | | 701/31.4 |
| 2009/0326738 A1* | 12/2009 | Ferro | G06F 11/2257 |
| | | | 701/3 |
| 2010/0312420 A1* | 12/2010 | Sham | G06Q 10/00 |
| | | | 701/3 |
| 2013/0138467 A1 | 5/2013 | Small et al. | |
| 2013/0317688 A1* | 11/2013 | Uratani | G01M 15/10 |
| | | | 701/29.1 |
| 2013/0317689 A1* | 11/2013 | Uratani | G01M 15/10 |
| | | | 701/29.1 |
| 2015/0121140 A1* | 4/2015 | Senf | G06F 11/3668 |
| | | | 714/33 |
| 2015/0134187 A1* | 5/2015 | Shelley | G07C 5/006 |
| | | | 701/29.3 |
| 2016/0068280 A1 | 3/2016 | Buehler et al. | |
| 2016/0071331 A1 | 3/2016 | Angus et al. | |
| 2016/0077522 A1* | 3/2016 | Endrerud | G06F 11/00 |
| | | | 702/188 |
| 2017/0132851 A1* | 5/2017 | Blackman | G07C 5/0808 |
| 2017/0185937 A1* | 6/2017 | Ricordeau | G05B 23/024 |

\* cited by examiner

APPARATUS AND METHOD FOR ASSISTING WITH FUNCTIONAL TESTING OF AIRCRAFT SYSTEMS

CROSS-REFERENCE TO RELATED APPLICATION(S)

This application is a national phase application under 35 U.S.C. 371 of International Patent Application No. PCT/CA2018/051275 filed on Oct. 10, 2018, which claims priority from U.S. Provisional Patent Application Ser. No. 62/570,961 filed on Oct. 11, 2017, the entire content of which is incorporated herein by reference.

TECHNICAL FIELD

The disclosure relates generally to aircraft, and more particularly to functional testing of aircraft systems.

BACKGROUND OF THE ART

Before a flight of an aircraft, part of a flight crew's workload includes the execution of tests on some aircraft systems prior to takeoff. The flight crew's execution of the pre-flight tests can be guided by a checklist and can require the flight crew to interface with controls and display devices scattered throughout the flight deck. The task of conducting the pre-flight tests is important to the safe operation of the aircraft but can be time consuming, contribute to pilot workload and can be prone to errors such as an unintended omission of a pre-flight test.

SUMMARY

In one aspect, the disclosure describes an apparatus for assisting with functional testing of systems of an aircraft. The apparatus comprises:
 a display device;
 one or more data processors operatively coupled to the display device; and
 non-transitory machine-readable memory operatively coupled to the one or more data processors, storing instructions executable by the one or more data processors and configured to cause the one or more data processors to:
 generate an output for causing the display device to display a plurality of test objects respectively associated with a plurality of functional tests of respective systems of the aircraft;
 using data indicative of a condition of the aircraft, select one or more selected functional tests from the plurality of functional tests based on the condition of the aircraft; and
 generate an output for causing the display device to identify one or more identified test objects from the plurality of test objects, the one or more identified test objects being respectively associated with the one or more selected functional tests.

The non-transitory machine-readable memory may contain data indicative of a predefined testing order for the selected functional tests. The instructions may be configured to cause the one or more data processors to generate an output for causing the display device to display the identified test objects according to the predetermined testing order.

The instructions may be configured to cause the one or more data processors to generate an output for initiating a plurality of the selected functional tests according to the predetermined testing order.

The instructions may be configured to cause the one or more data processors to generate an output for causing the display device to display a condition object indicating the condition of the aircraft. The condition object may be responsive to user input indicative of the condition of the aircraft.

The instructions may be configured to cause the one or more data processors to generate an output for causing the display device to display an execution object configured to trigger an automated initiation of some or all of the selected functional tests in response to user input.

The instructions may be configured to cause the one or more data processors to generate an output for causing an execution of two or more of the selected functional tests in parallel.

The instructions may be configured to cause the one or more data processors to generate an output for causing the display device to display status information associated with one or more of the plurality of test objects.

Identifying the one or more identified test objects may comprise visually distinguishing the one or more identified test objects from any non-identified test objects.

The instructions may be configured to cause the one or more data processors to generate an output for causing the display device to display an enclosure that surrounds all of the identified test objects.

One or more of the plurality of test objects may be responsive to respective user input. The instructions may be configured to, in response to the respective user input, cause the one or more data processors to generate an output for initiating the respective one or more of the plurality of functional tests associated with the one or more of the plurality of test objects responsive to respective user input.

The plurality of functional tests may be pre-flight functional tests and the data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes a computer-implemented method for assisting with functional testing of systems of an aircraft. The method comprises:
 receiving data indicative of a condition of the aircraft;
 causing a display device to display a plurality of test objects respectively associated with a plurality of functional tests of respective systems of the aircraft;
 using the data indicative of the condition of the aircraft, selecting one or more selected functional tests from the plurality of functional tests based on the condition of the aircraft; and
 causing the display device to identify one or more identified test objects from the plurality of test objects, the one or more identified test objects being respectively associated with the one or more selected functional tests.

The method may comprise causing the display device to display the identified test objects according to a predetermined testing order.

The method may comprise initiating a plurality of the selected functional tests according to the predetermined testing order.

The method may comprise causing the display device to display a condition object indicating the condition of the aircraft.

The condition object may be responsive to user input indicative of the condition of the aircraft.

The method may comprise causing the display device to display an execution object configured to trigger an automated initiation of some or all of the selected functional tests in response to user input.

The method may comprise causing an execution of two or more of the selected functional tests in parallel.

The method may comprise causing the display device to display status information associated with one or more of the plurality of test objects.

Identifying the one or more identified test objects may comprise visually distinguishing the one or more identified test objects from any non-identified test objects.

The method may comprise causing the display device to display an enclosure that surrounds all of the identified test objects.

One or more of the test objects may be responsive to respective user input. The method may comprise, in response to the respective user input, initiating respective one or more of the plurality of functional tests associated with the one or more of the plurality of test objects responsive to respective user input.

The plurality of functional tests may be pre-flight functional tests. The data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes a computer program product for assisting with functional testing of systems of an aircraft, the computer program product comprising a non-transitory computer readable storage medium containing program code. The program code is readable/executable by a computer, processor or logic circuit to perform a method comprising:
  causing a display device to display a plurality of test objects respectively associated with a plurality of functional tests of respective systems of the aircraft; and
  using data indicative of the condition of the aircraft, selecting one or more selected functional tests from the plurality of functional tests based on the condition of the aircraft; and
  causing the display device to identify one or more identified test objects from the plurality of test objects, the one or more identified test objects being respectively associated with the one or more selected functional tests.

The method may comprise causing the display device to display the identified test objects according to a predetermined testing order.

The method may comprise initiating a plurality of the selected functional tests according to the predetermined testing order.

The method may comprise causing the display device to display a condition object indicating the condition of the aircraft.

The condition object may be responsive to user input indicative of the condition of the aircraft.

The method may comprise causing the display device to display an execution object configured to trigger an automated initiation of some or all of the selected functional tests in response to user input.

The method may comprise causing an execution of two or more of the selected functional tests in parallel.

The method may comprise causing the display device to display status information associated with one or more of the plurality of test objects.

Identifying the one or more identified test objects may comprise visually distinguishing the one or more identified test objects from any non-identified test objects.

The method may comprise causing the display device to display an enclosure that surrounds all of the identified test objects.

One or more of the plurality of test objects may be responsive to respective user input. The method may comprise, in response to the respective user input, initiating respective one or more of the plurality of functional tests associated with the one or more of the plurality of test objects responsive to respective user input.

The plurality of functional tests may be pre-flight functional tests. The data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes a display device for assisting with functional testing of systems of an aircraft. The display device comprises:
  a display area;
  a plurality of test objects displayed in the display area, the plurality of test objects being respectively associated with a plurality of functional tests of respective systems of the aircraft; and
  a visual indication identifying one or more identified test objects from the plurality of test objects, the one or more identified test objects being respectively associated with one or more selected functional tests selected from the plurality of functional tests based on a condition of the aircraft.

The identified test objects may be displayed according to a predetermined testing order.

The display device may comprise a condition object displayed in the display area where the condition object indicates the condition of the aircraft. The condition object may be responsive to user input indicative of the condition of the aircraft.

The display device may comprise an execution object displayed in the display area. The execution object may be responsive to user input and configured to trigger an automated initiation of some or all of the selected functional tests in response to user input.

The display device may comprise status information displayed in the display area. The status information may be associated with one or more of the plurality of test objects.

The one or more identified test objects may be visually distinguished from any non-identified test objects.

The display device may comprise an enclosure displayed in the display area where the enclosure surrounds all of the identified test objects.

Embodiments can include combinations of the above features.

In another aspect, the disclosure describes an apparatus for assisting with functional testing of systems of an aircraft. The apparatus comprises:
  one or more data processors; and non-transitory machine-readable memory operatively coupled to the one or more data processors, storing instructions executable by the one or more data processors and configured to cause the one or more data processors to:
select, based on data indicative of a condition of the aircraft, two or more selected functional tests of respective two or more systems of the aircraft; and
generate an output for initiating the two or more selected functional tests.

The non-transitory machine-readable memory may contain data indicative of a predefined testing order for the selected functional tests. The initiation of the two or more selected functional tests may be in accordance with the predetermined testing order.

The instructions may be configured to cause the one or more data processors to generate an output for causing a display device to display an execution object configured to trigger an automated initiation of some or all of the selected functional tests in response to user input.

The instructions may be configured to cause the one or more data processors to generate an output for causing a display device to display a condition object indicating the condition of the aircraft. The condition object may be responsive to user input indicative of the condition of the aircraft.

The instructions may be configured to cause the one or more data processors to generate an output for causing the display device to display an execution object configured to trigger an automated initiation of some or all of the selected functional tests in response to user input.

The instructions may be configured to cause the one or more data processors to generate an output for causing an execution of at least two of the selected functional tests in parallel.

The selected functional tests may be pre-flight functional tests. The data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes a computer-implemented method for assisting with functional testing of systems of an aircraft. The method comprises:
receiving data indicative of a condition of the aircraft;
selecting, based on the data indicative of the condition of the aircraft, two or more selected functional tests of respective two or more systems of the aircraft; and
initiating the two or more selected functional tests.

The method may comprise initiating the two or more selected functional tests according to a predetermined testing order.

The method may comprise causing a display device to display an execution object configured to trigger an automated initiation of some or all of the selected functional tests in response to user input.

The method may comprise causing a display device to display a condition object indicating the condition of the aircraft, the condition object being responsive to user input indicative of the condition of the aircraft.

The method may comprise causing the display device to display an execution object configured to trigger an automated initiation of some or all of the selected functional tests in response to user input.

The method may comprise causing an execution of at least two of the selected functional tests in parallel.

The selected functional tests may be pre-flight functional tests. The data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes a computer program product for assisting with functional testing of systems of an aircraft, the computer program product comprising a non-transitory computer readable storage medium containing program code. The program code being readable/executable by a computer, processor or logic circuit to perform a method comprising:
receiving data indicative of a condition of the aircraft;
selecting, based on the data indicative of the condition of the aircraft, two or more selected functional tests of respective two or more systems of the aircraft; and
initiating the two or more selected functional tests.

The method may comprise initiating the two or more selected functional tests according to a predetermined testing order.

The method may comprise causing a display device to display an execution object configured to trigger an automated initiation of some or all of the selected functional tests in response to user input.

The method may comprise causing a display device to display a condition object indicating the condition of the aircraft, the condition object being responsive to user input indicative of the condition of the aircraft.

The method may comprise causing the display device to display an execution object configured to trigger an automated initiation of some or all of the selected functional tests in response to user input.

The method may comprise causing an execution of at least two of the selected functional tests in parallel.

The selected functional tests may be pre-flight functional tests. The data indicative of the condition of the aircraft may be indicative of any of the following: whether a next flight of the aircraft is a first flight of a day; whether the next flight of the aircraft immediately follows a change in flight crew; and whether the next flight of the aircraft immediately follows a cold and dark start of the aircraft.

Embodiments can include combinations of the above features.

In another aspect, the disclosure describes an aircraft comprising an apparatus as disclosed herein.

In another aspect, the disclosure describes an aircraft comprising a display device as disclosed herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure describes apparatus and methods associated with functional testing of systems of aircraft and other mobile platforms. Even though various aspects the present disclosure are described in the context of aircraft, it is understood that aspects disclosed herein are also applicable to other mobile platforms (e.g., vehicles) such as trains, ships and busses for example. In various embodiments, the apparatus and methods disclosed herein can improve the operation of an aircraft flight deck and alleviate workload for the flight crew of an aircraft by facilitating (e.g., pre-flight) functional testing of aircraft systems. For example, in comparison with existing aircraft, apparatus and methods disclosed herein can help reduce an amount of time required for functional testing and also can reduce the potential for flight crew errors such as an unintended omission of a pre-flight functional test for example.

Aspects of various embodiments are described through reference to the drawings.

Figure 1:
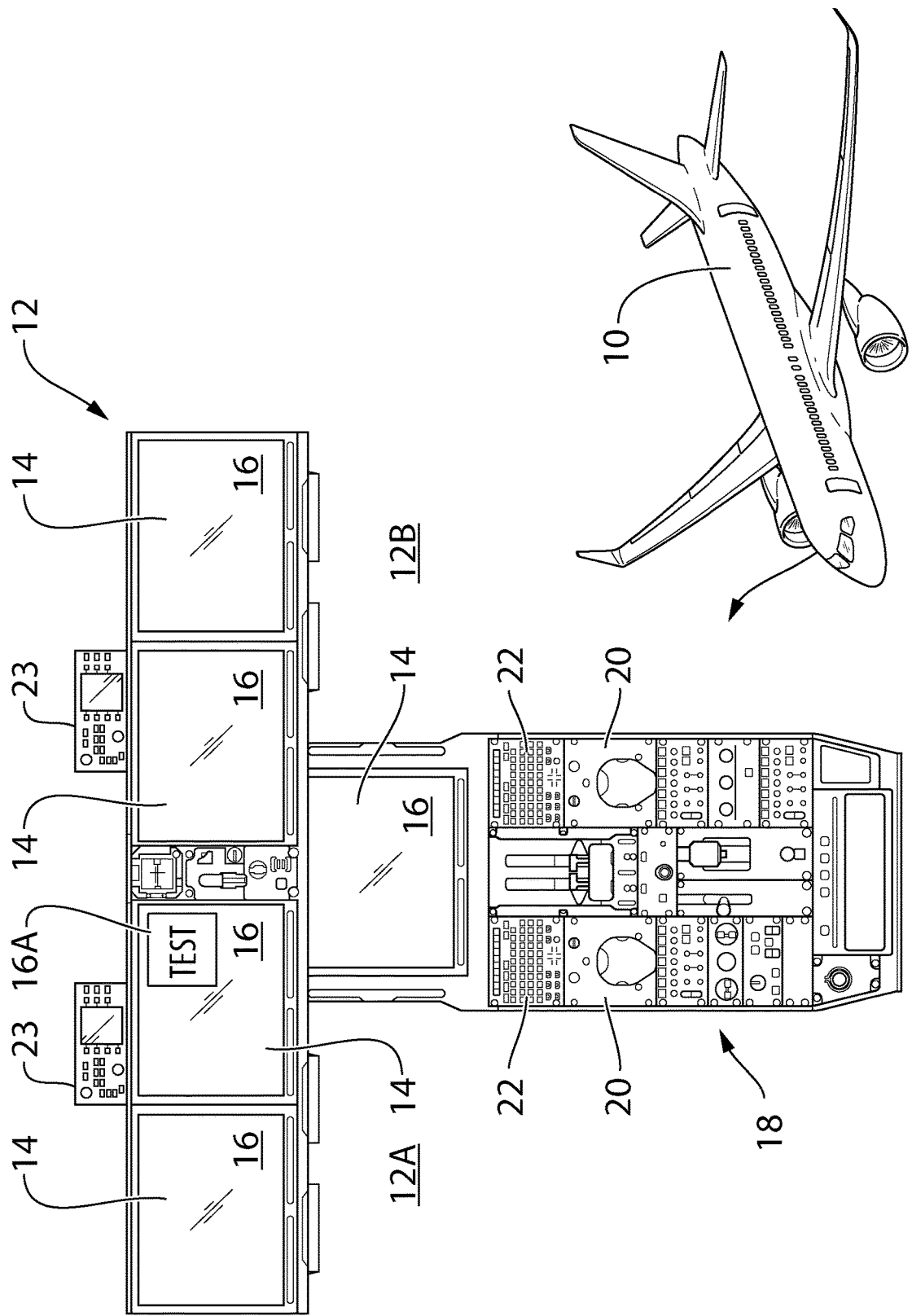
FIG. 1 shows an exemplary aircraft flight deck and a corresponding exemplary aircraft comprising the flight deck.

FIG. 1 shows an exemplary aircraft 10 (i.e., mobile platform) and a partial schematic representation of flight deck 12 which can be part of aircraft 10. Aircraft 10 can be a corporate, private, commercial or any other type of aircraft. For example, aircraft 10 can be a fixed-wing aircraft. In some embodiments, aircraft 10 can be a narrow-body, twin engine jet airliner. Flight deck 12 can comprise additional or fewer elements than those shown and described herein. Flight deck 12 can comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B can comprise functionally identical components so that at least some operational redundancy can be provided between left portion 12A and right portion 12B of flight deck 12. As used herein, the term "flight crew" is intended to encompass one or more individuals responsible for the operation of aircraft 10. Such individuals can, for example, include the pilot and/or the co-pilot.

Flight deck 12 can comprise one or more display devices 14 providing respective display areas 16. In the exemplary configuration of flight deck 12 shown in FIG. 1, left portion 12A and right portion 12B can each comprise two display devices 14 and an additional display device 14 can be provided in pedestal region 18 of flight deck 12. Display device 14 provided in pedestal region 18 can be shared between the pilot and the co-pilot during normal operation of aircraft 10. Display devices 14 can include one or more cathode-ray tubes (CRTs), liquid crystal displays (LCDs), plasma displays, light-emitting diode (LED) based displays or any type of display device suitable for use in flight deck 12. Display devices 14 can be configured to dynamically display operational and status information about various systems of aircraft 10, information related to flight/mission planning, maps and any other information that can be useful for the flight crew during the operation of aircraft 10. Display devices 14 can facilitate dialog between the flight crew and various systems of aircraft 10 via suitable graphical user interfaces. Flight deck 12 can comprise one or more data input devices such as, for example, one or more cursor control devices 20, one or more multi-function keypads 22 and one or more (e.g., standalone or multifunction) controllers 23 that permit data entry by the flight crew. In some embodiments, one or more display devices 14 could have touch sensitive display area(s) 16 to permit user input by way of the flight crew touching the applicable display area(s) 16.

One or more display devices 14 can be used to display functional testing page 16A for facilitating the execution of functional tests of various systems of aircraft 10 as described further below. Functional testing page 16A can be displayed on any suitable display device 14 of flight deck 12 or on some other display device visible to the flight crew. In some embodiments, flight deck 12 can be configured to permit the selective display of functional testing page 16A on one or more display device 14 based on input from the flight crew. In some embodiments, a single instance of functional testing page 16A can be displayed on a display device 14 that is conveniently located to be visible by both the pilot and the co-pilot.

It is understood that functional testing page 16A and the display of its contents is not limited to one or more display devices 14 that is part of flight deck 12 or that is onboard aircraft 10. For example, functional testing page 16A could, alternatively or in addition, be provided on a display device that is off of aircraft 10. For example, functional testing page 16A could be provided on a mobile device (e.g. a laptop or tablet) that is part of a flight crew's electronic flight bag, or could be a display device of a ground station that permits a ground-based operator of aircraft 10 or support (e.g., maintenance) personnel to execute one or more functional tests on systems of aircraft 10. Even though the present disclosure refers to the interaction of a flight crew of aircraft 10 with functional testing page 16A, it is understood that relevant information could be transmitted from aircraft 10 to a location remote from aircraft 10 (e.g., ground station) in order to be used by an individual at such location in accordance with aspects of the present disclosure.

Figure 2:
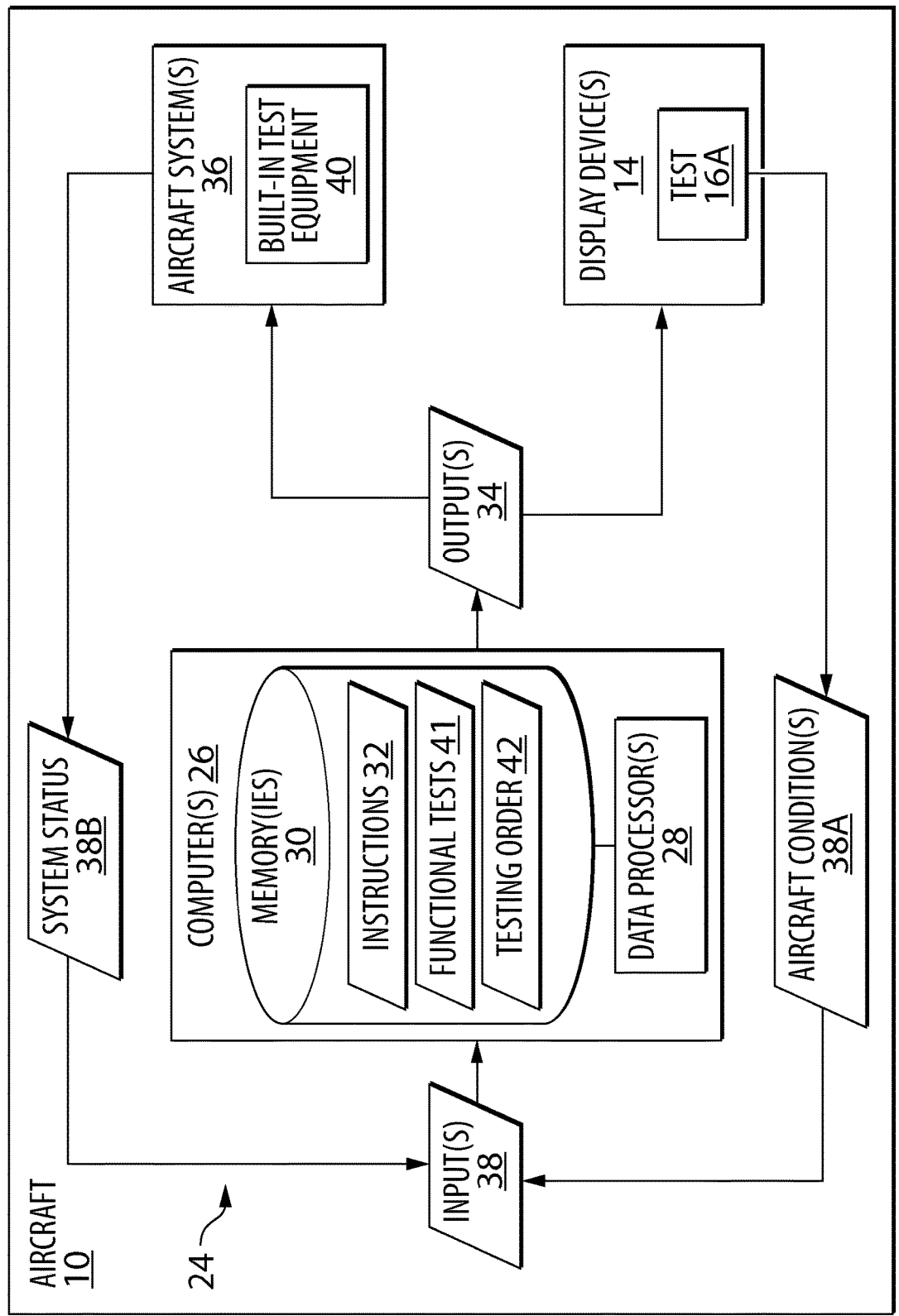
FIG. 2 shows a schematic representation of an exemplary apparatus for assisting with functional testing of systems of the aircraft of FIG. 1.

FIG. 2 shows a schematic representation of an exemplary apparatus 24 which can be part of aircraft 10 and which can assist with functional testing of systems of aircraft 10. Apparatus 24 can be integrated with flight deck 12. Apparatus 24 can comprise one or more computers 26 (referred hereinafter in the singular) operatively coupled to one or more display devices 14 (referred hereinafter in the singular) of flight deck 12. Computer 26 can comprise one or more data processors 28 (referred hereinafter in the singular) and one or more computer-readable memories 30 (referred hereinafter in the singular) storing machine-readable instructions 32 executable by data processor 28 and configured to cause data processor 28 to generate one or more outputs 34 (referred hereinafter in the singular). Output 34 can comprise one or more signals for causing display device 14 of aircraft 10 to display functional testing page 16A and its contents. Output 34 can also comprise one or more signals for causing the initiation of functional tests of one or more systems 36 of aircraft 10.

Computer 26 can receive input(s) 38 in the form of data or information that can be processed by data processor 28 based on instructions 32 in order to generate output 34. For example, input 38 can comprise information (data) indicative of a condition 38A of aircraft 10. The number and types of pre-flight functional tests to be executed on aircraft 10 can differ depending on aircraft condition 38A (e.g., pre-flight circumstance). For example, the number of pre-flight functional tests to be executed on aircraft 10 for a first condition of aircraft 10 can be greater than the number of pre-flight functional tests to be executed on aircraft 10 for a second condition of aircraft 10. For example, a longer list of pre-flight functional tests can be required before a first flight of the day (i.e., 24-hour period) and a shorter list of pre-flight functional tests can be required before a subsequent flight on the same day. In some embodiments, aircraft condition 38A can be indicative of whether there has been a change in flight crew for aircraft 10. For example, a longer list of pre-flight functional tests can be required before a flight that immediately follows a change in flight crew for aircraft 10 and a shorter list of pre-flight functional tests can be required before a subsequent flight of the same flight crew for aircraft 10. In some embodiments, aircraft condition 38A can be indicative of whether aircraft 10 is being prepared for a flight that immediately follows a period of inactivity requiring a complete power-down of aircraft 10. For example, a longer list of pre-flight functional tests can be required before a flight that immediately follows a cold and dark start of aircraft 10.

In some embodiments, input 38 can additionally comprise information (data) indicative of a substantially real-time status 38B of one or more systems 36 of aircraft 10. Such system status 38B can be indicative of an operational state of a corresponding system 36 and/or can be indicative of a state of execution of a functional test for the corresponding system 36. For example, system status 38B can be indicative of whether an aircraft system 36 is active (e.g., ON), inactive (e.g., OFF), comprises a fault or has failed. Alternatively or in addition, system status 38B can be indicative of whether an aircraft system 38B has passed or failed an associated functional test. With respect to the execution of a functional test, an associated system status 38B can be indicative of whether the functional test is required but has not yet been conducted, is in progress or is complete.

In various embodiments, system status 38B can be provided by way of input by the flight crew into apparatus 24 and/or can be provided automatically from the applicable system 36. In various embodiments, functional testing of aircraft systems 36 can be automated to different extents depending on the particular aircraft system 36. For example, some functional tests can be fully automated after their initiation so that no further input from the flight crew is required. Alternatively, some functional tests can require the flight crew to be in the loop so that the flight crew can remain in control of the functional testing procedure while being guided through the procedure. For example, system status 38B can comprise feedback from the flight crew following a visual inspection confirming the associated system status 38B. Alternatively, or in addition, system status 38B can be provided from one or more sensors or built-in test equipment 40 integrated with a particular aircraft system 36. For example, one or more aircraft systems 36 can each comprise built-in test equipment 40 that is capable of automatically performing a functional self-test and report status information. Built-in test equipment 40 can comprise a testing circuit that is a permanent part of the applicable aircraft system 36 and enables functional testing and diagnostics of aircraft system 36. In other words, such built-in test equipment 40 can comprise test equipment configured to provide status information on the health of a particular aircraft system 36 of aircraft 10 and/or status information on the execution of a particular functional test.

In some embodiments, input 38 can include or be indicative of sensed signals acquired via one or more (e.g., pressure, position, acceleration, temperature or other) sensors associated with one or more aircraft systems 36. Accordingly, input 38 can comprise one or more sensed parameters indicative of one or more system status 38B of aircraft system(s) 36 and/or of one or more aircraft conditions 38A. As described further below, computer 26 can, based on input 38, generate output 34 for causing display device 14 to display a plurality of test objects associated with functional tests of aircraft systems 36 and visually identify one or more of the test objects associated with respective one or more functional tests selected based on aircraft condition 38A in order to assist the flight crew with the execution of the applicable functional tests.

Computer 26 can be part of an avionics suite of aircraft 10 or can otherwise be operatively integrated with avionic components of aircraft 10. For example, in some embodiments, computer 26 can be configured to carry out additional functions than those described herein including the management of one or more graphic user interfaces of flight deck 12 and/or other part(s) of aircraft 10. In various embodiments, computer 26 can comprise more than one computer or data processor where the methods disclosed herein (or part(s) thereof) could be performed using a plurality of computers or data processors, or, alternatively, be performed entirely using a single computer or data processor. In some embodiments, computer 26 could be physically integrated with (e.g., embedded in) display device 14.

Data processor 28 can comprise any suitable device(s) configured to cause a series of steps to be performed by computer 26 so as to implement a computer-implemented process such that instructions 32, when executed by computer 26 or other programmable apparatus, can cause the functions/acts specified in the methods described herein to be executed. Data processor 28 can comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 30 can comprise any suitable known or other machine-readable storage medium. Memory 30 can comprise non-transitory computer readable storage medium such as, for example, but not limited to, an electronic, magnetic, optical, electromagnetic, infrared, or semiconductor system, apparatus, or device, or any suitable combination of the foregoing. Memory 30 can include a suitable combination of any type of computer memory that is located either internally or externally to computer 26. Memory 30 can comprise any storage means (e.g. devices) suitable for retrievably storing machine-readable instructions 32 executable by data processor 28.

Various aspects of the present disclosure can be embodied as apparatus, devices, methods and/or computer program products. Accordingly, aspects of the present disclosure can take the form of an entirely hardware embodiment, an entirely software embodiment (including firmware, resident software, micro-code, etc.) or an embodiment combining software and hardware aspects. Furthermore, aspects of the present disclosure can take the form of a computer program product embodied in one or more non-transitory computer readable medium(ia) (e.g., memory 30) having computer readable program code (e.g., instructions 32) embodied thereon. The computer program product can, for example, be executed by computer 26 to cause the execution of one or more methods disclosed herein in entirety or in part.

Computer program code for carrying out operations for aspects of the present disclosure in accordance with instructions 32 can be written in any combination of one or more programming languages, including an object oriented programming language such as Java, Smalltalk, C++ or the like and conventional procedural programming languages, such as the "C" programming language or other programming languages. Such program code can be executed entirely or in part by computer 26 or other data processing device(s). It is understood that, based on the present disclosure, one skilled in the relevant arts could readily write computer program code for implementing the methods disclosed herein.

Memory 30 can contain functional test data 41 indicative of (e.g., pre-flight) functional tests associated with aircraft systems 36. Functional test data 41 can also comprise information indicative of which functional tests being applicable to which aircraft condition 38A. Accordingly, functional test data 41 can be used by computer 26 to select applicable functional tests based on aircraft condition 38A.

Memory 30 can also contain testing order data 42 indicative of a predetermined testing order for the pre-flight functional tests to be conducted. Testing order data 42 can be used by computer 26 to generate functional testing page 16A on display device 14 and further assist (e.g., guide) the flight crew in conducting the applicable functional tests in the recommended testing order. Alternatively or in addition, testing order data 42 can be used by computer 26 to cause the automated initiation of the functional tests according to the predetermined testing order.

Figure 3:
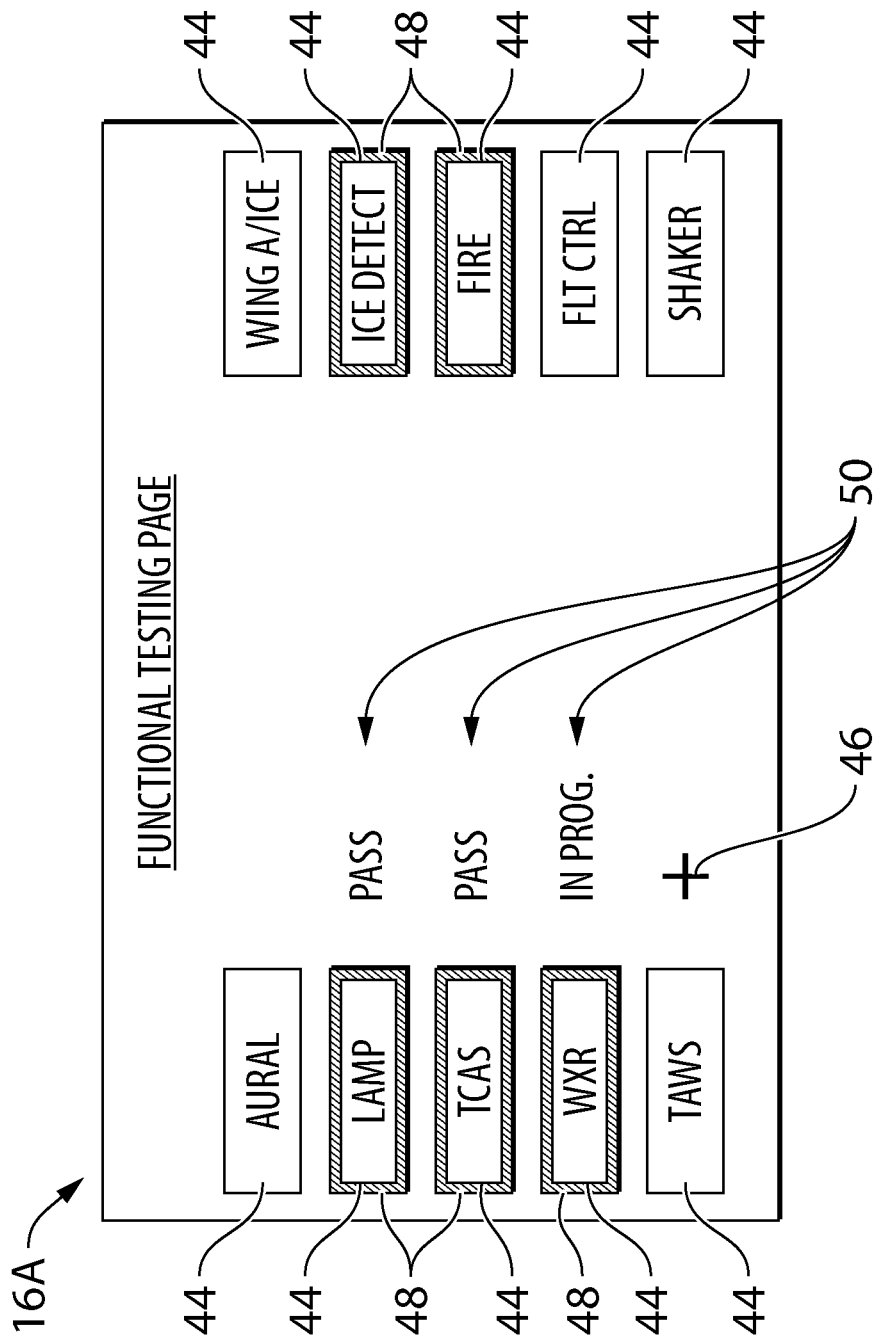
FIG. 3 shows an exemplary functional testing page for displaying on a display device of the apparatus of FIG. 2.

FIG. 3 shows an exemplary functional testing page 16A that can be displayed on display device 14 of apparatus 24. As explained above, functional testing page 16A and its contents can be generated based on machine-readable instructions 32 via computer 26 of apparatus 24. Functional testing page 16A can contain a plurality of test objects 44 where each test object 44 is associated with a functional test of an aircraft system 36 of aircraft 10. As illustrated in FIG. 3, examples of aircraft systems 36 can include an aural warning system (AURAL), a lighting system (LAMP), a traffic collision avoidance system (TCAS), a weather radar (WRX), a terrain awareness and warning system (TAWS), an ice protection system (WING A/ICE), an ice detection system (ICE DETECT), a fire protection system (FIRE), a flight control system (FLT CTRL) and a stick shaker (SHAKER). In order to assist the flight crew with the execution of the applicable functional tests, functional testing page 16A can also visually identify one or more of the test objects 44 associated with respective one or more functional tests selected based on aircraft condition 38A.

Functional testing page 16A can provide status information to the flight crew about the execution of the functional tests whether or not the functional tests are initiated automatically or based on input from the flight crew. In embodiments where the initiation of the functional tests is controlled by the flight crew, functional testing page 16A can be configured to serve as a graphic user interface via which input from the flight crew can be received. For example, one or more of test objects 44 can be responsive to user input. Test objects 44 can comprise interactive and/or non-interactive widgets. For example, test object 44 can include buttons, icons, radio buttons, check boxes, editable data fields, lists of selectable items, pull-down menus, display-only text and/or graphic fields and/or any other objects suitable for use in graphical user interfaces. The flight crew's interaction with functional testing page 16A can be achieved through the use of cursor 46 that can be movable over some or all of functional testing page 16A. The movement of cursor 46 can be controlled by the flight crew via cursor control device 20 and/or directional movement keys provided on multi-function keypads 22 for example. It is understood that other means (e.g., touchscreen) to permit user input by the flight crew can also be suitable.

In the embodiment illustrated in FIG. 3, test objects 44 can be graphical push buttons that can be actuated through the use of cursor 46 to thereby cause the initiation of an associated functional test. For example, instructions 32 can be configured to, in response to an actuation of one or more test objects 44, cause processor 28 to generate output 34 for causing initiation of the respective one or more functional tests associated with the one or more of test objects 44.

In some embodiments, functional testing page 16A can assist the flight crew by providing a single common interface and location that facilitates the execution of a plurality of functional tests in order to reduce or eliminate the need for the flight crew to interface with controls and display devices scattered throughout the flight deck 12. In some embodiments, the use of functional testing page 16A can reduce the potential for error during pre-flight functional testing of applicable aircraft systems 36.

By way of the displayed test objects 44, functional testing page 16A can provide a list of available (e.g., pre-flight) functional tests and identify one or more of the displayed test objects 44 associated with the respective one or more functional tests that are selected based on aircraft condition 38A. The selected functional tests can comprise a subset of the list of available functional tests and hence represent a shorter list of functional tests that are specifically applicable (e.g., recommended or required) to aircraft condition 38A.

In some embodiments, some non-identified test objects 44 associated with functional tests that are not specifically selected based on aircraft condition 38A can still be displayed on functional testing page 16A so as to remain available for selection by the flight crew. For example, the flight crew can still have access to some functional tests that are not specifically selected based on aircraft condition 38A but that can optionally be initiated if desired.

The identification of the applicable test objects 44 to the flight crew can be achieved by visually distinguishing the one or more identified test objects 44 from any non-identified test objects 44. In the embodiment of FIG. 3, the visual distinction is achieved by highlighting the identified test objects 44. Such highlighting can comprise using a border 48 shown only around the respective identified test objects 44. It is understood that the visual distinction of the identified test objects 44 can be achieved in any suitable manner including changing an appearance (e.g., color, brightness) of the identified test objects 44 and/or of the non-identified test objects 44 for example.

Testing order data 42 can be used by computer 26 to determine the layout of functional testing page 16A. In some embodiments, testing order data 42 can be contextual and dependent on aircraft condition 38A. Testing order data 42 can represent a predefined or mandated order of execution of the functional tests. For example, the execution of one functional test can require the prior execution of another functional test. For example, some functional tests may need to be executed serially and some functional tests may be executed simultaneously in parallel.

In some embodiments, the arrangement of test objects 44 on functional testing page 16A can be in accordance with testing order data 42. For example, test objects 44 can be arranged in rows/columns that serve to visually guide the flight crew in initiating the functional tests in the order defined by testing order data 42. For example, test objects 44 can be arranged in one or more rows where the sequential left to right positioning of test objects 44 in each row is defined by testing order data 42. Similarly, test objects 44 can be arranged in one or more columns where the sequential vertical positioning of test objects 44 in each column is defined by testing order data 42.

In some embodiments, instead of relying on the flight crew to select test objects 44 in the predefined order using cursor 46 based on the layout of functional testing page 16A, instructions 32 can be configured to, in the case of multiple functional tests having been selected for execution by the flight crew, automatically adjust the order of execution of the functional tests based on testing order data 42 irrespective of the order of the flight crew's selection of the functional tests. For example, the flight crew could select some or all of the identified test objects 44 (and optionally one or more non-identified test objects 44) in any order and computer 26 can then, based on instructions 32, cause the initiation of the selected functional tests according to testing order data 42. In this embodiment, the predefined testing order can be achieved without necessarily having to configure the layout of functional testing page 16A based on testing order data 42.

Testing order data 42 can also contain information as to which functional tests can be conducted simultaneously in parallel and which functional tests must be conducted at separate times. Accordingly, computer 26 can, based on instructions 32 and testing order data 42, cause the automated initiation of some functional tests simultaneously in parallel and cause the automated sequencing of other functional tests in an optimized fashion so as to reduce the overall time required to functionally test the applicable systems 36 of aircraft 10. In some embodiments, the selection of multiple functional tests by the flight crew can also permit the computer 26 to optimize the execution of some functional tests without requiring the flight crew to wait for one functional test to finish before manually initiating another functional test. In other words, once multiple functional tests have been selected for execution by the flight crew, the computer 26 can initiate their execution automatically according to a sequence and timing that optimizes the completion of the set of functional tests that have been selected for execution.

In some embodiments, instructions 32 can be configured to cause display device 14 to display one or more status indicators 50. Status indicators 50 can provide system status information associated with one or more test objects 44. The information provided by status indicators 50 can be based on system status 38B described above.

Figure 4:
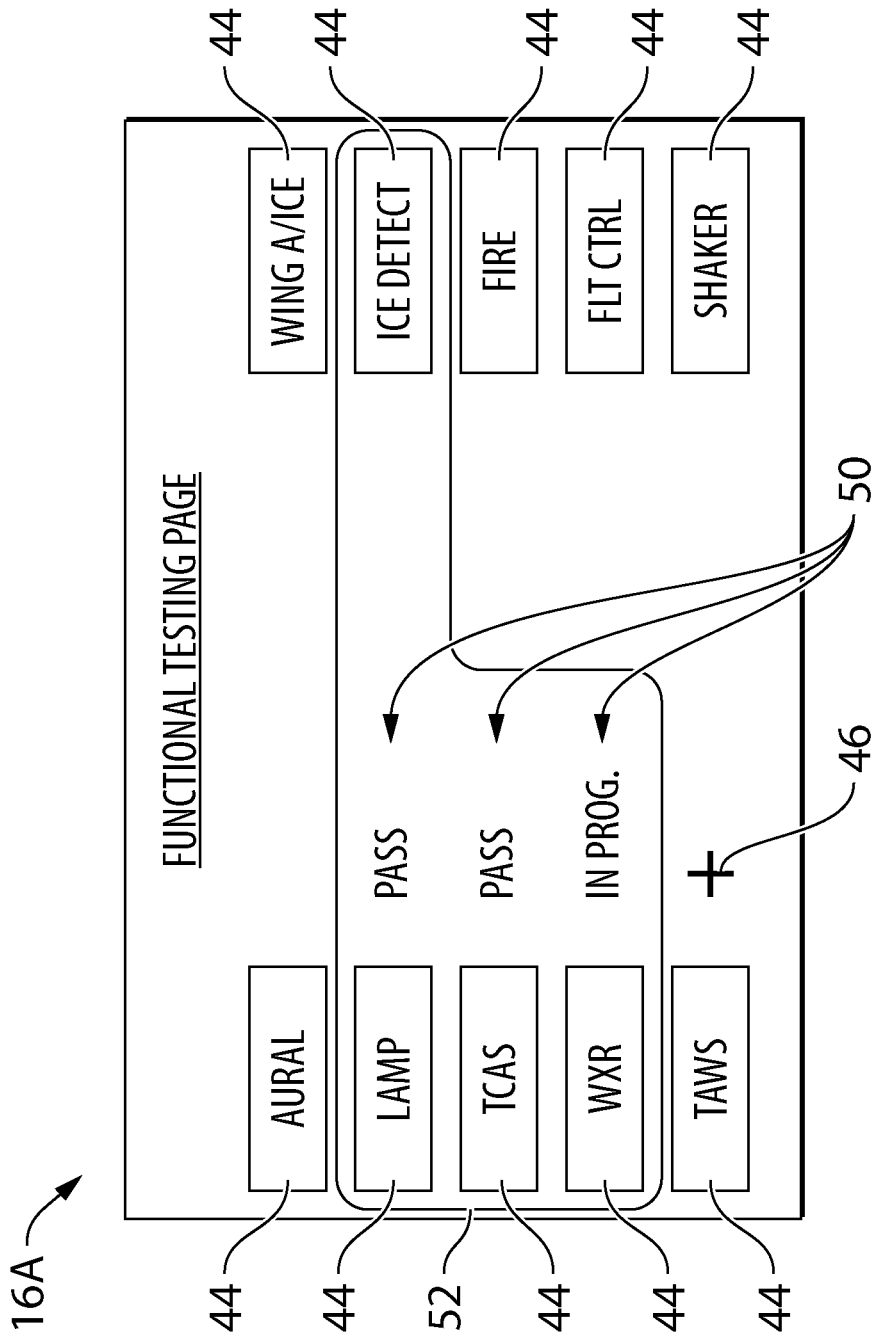
FIG. 4 shows another exemplary functional testing page for displaying on a display device of the apparatus of FIG. 2.

FIG. 4 shows another exemplary functional testing page 16A that can be displayed on display device 14 of apparatus 24. The embodiment of FIG. 4 shows another method of identifying test objects 44 associated with the functional tests selected based on aircraft condition 38A. Instead of changing the appearance of the identified test objects 44, the identified test objects 44 can be grouped together using a single enclosure 52 that surrounds the identified test objects 44. Enclosure 52 can comprise a line at least partially surrounding the identified test objects 44. In various embodiments, enclosure 52 can be represented by a solid or stippled line for example.

Figure 5:
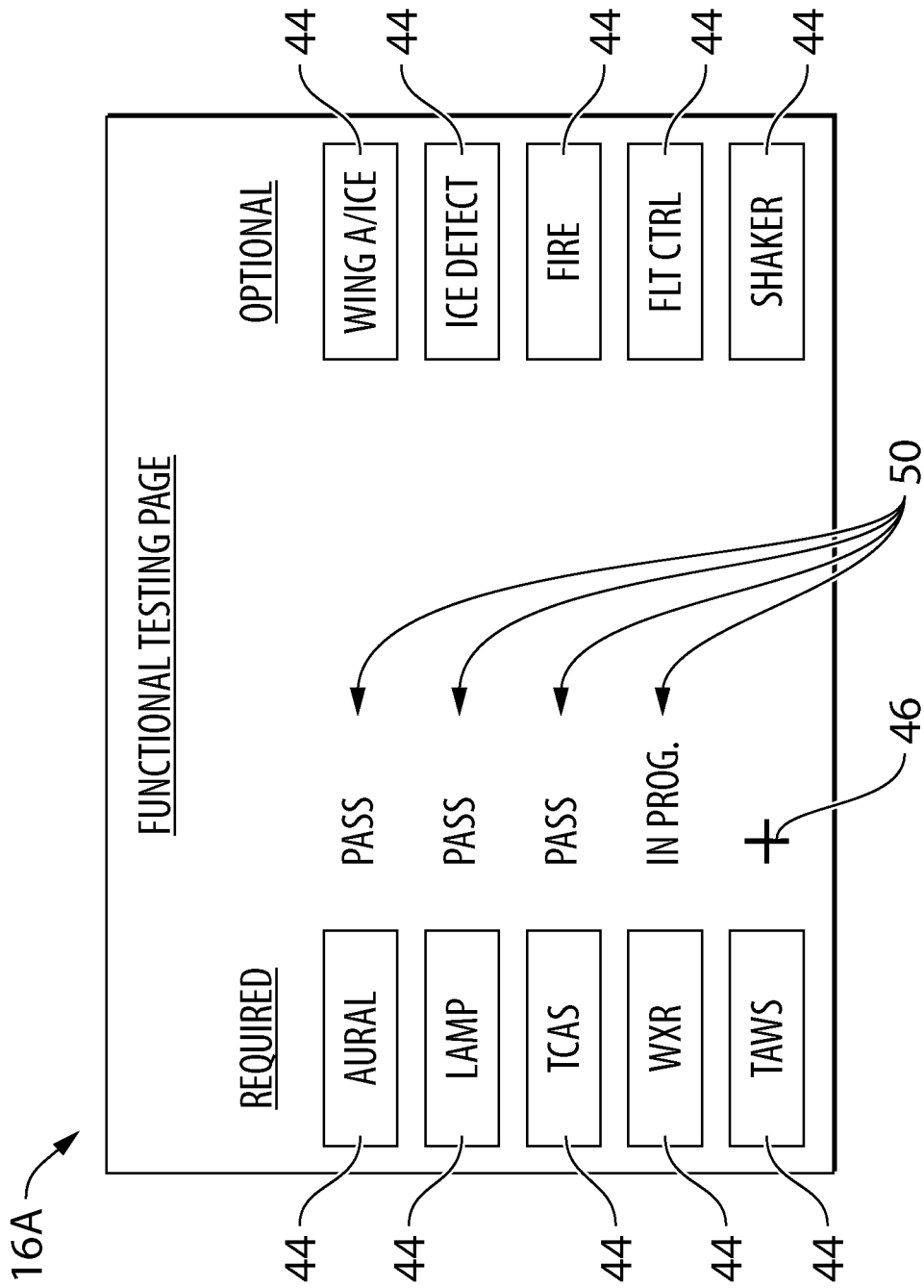
FIG. 5 shows another exemplary functional testing page for displaying on a display device of the apparatus of FIG. 2.

FIG. 5 shows another exemplary functional testing page 16A that can be displayed on display device 14 of apparatus 24. The embodiment of FIG. 5 shows another method of identifying test objects 44 associated with the functional tests selected based on aircraft condition 38A. Instead of identifying test objects 44 that are dispersed within a larger group of test objects 44, the layout of test objects 44 can be rearranged so that the identified test objects 44 are grouped together in one region of functional testing page 16A and the non-identified test objects 44 are grouped together in another region of functional testing page 16A. In the example shown in FIG. 5, the identified test objects 44 are grouped together in one column labeled as "REQUIRED" and the non-identified test objects 44 are grouped together in another column labeled as "OPTIONAL".

Figure 6:
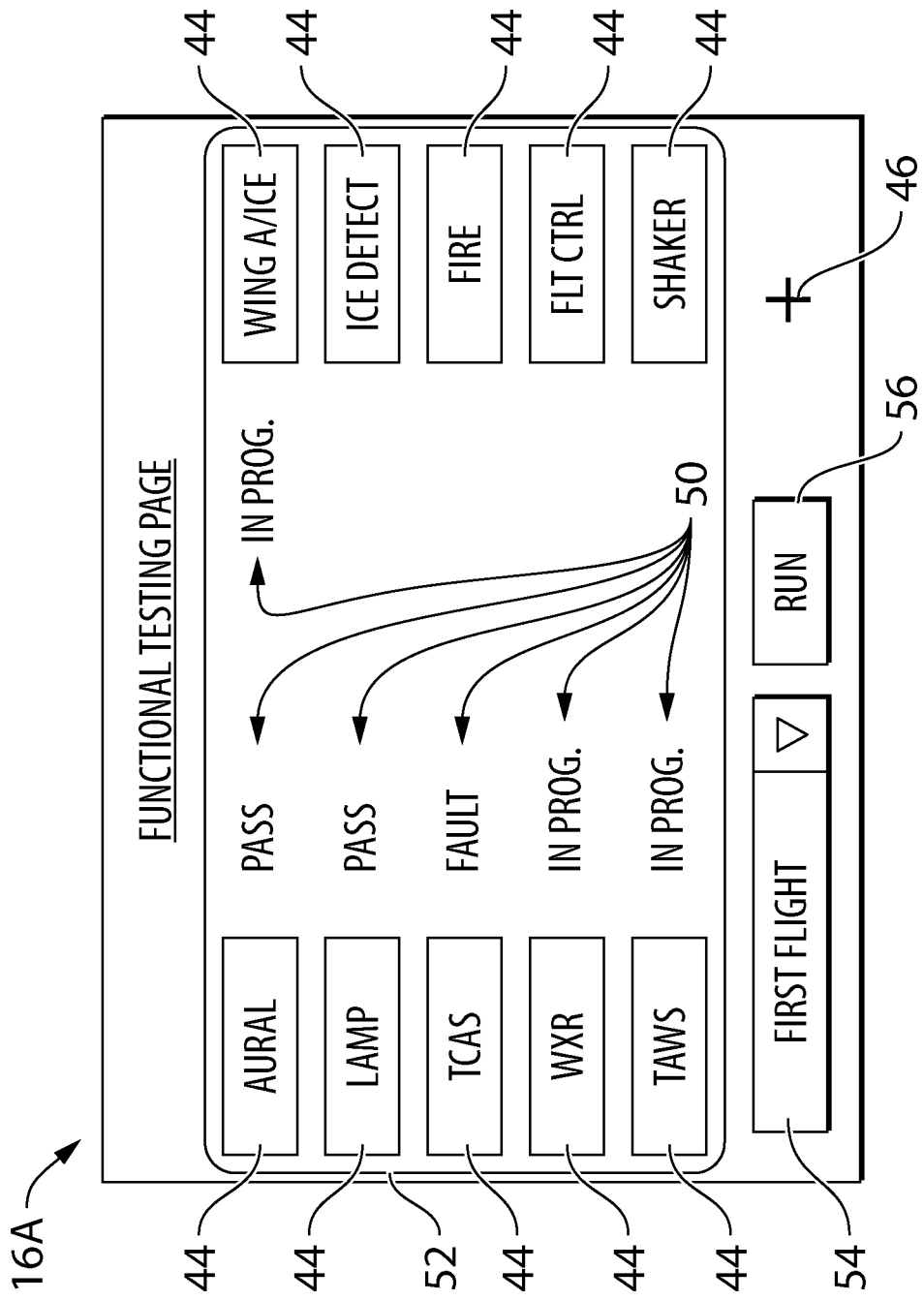
FIG. 6 shows another exemplary functional testing page for displaying on a display device of the apparatus of FIG. 2.

FIG. 6 shows another exemplary functional testing page 16A that can be displayed on display device 14 of apparatus 24. The embodiment of FIG. 6 includes condition object 54 being displayed on testing page 16A. Condition object 54 can be configured to provide an indication of the condition (e.g., pre-flight circumstance) of aircraft 10 and can be based on aircraft condition 38A (see FIG. 2). In some embodiments, condition object 54 can be responsive to user input so that the flight crew can input the condition of the aircraft 10 that will be used to select the required functional tests. For example, condition object 54 can include buttons, icons, radio buttons, check boxes, editable data field, list of selectable items, pull-down menu, display-only text and/or graphic fields and/or any other object(s) suitable for use in graphical user interfaces.

In some embodiments, condition object 54 can be automatically populated with a default value based on a condition of aircraft 10 that has been automatically determined by computer 26 or otherwise where the default value can be either accepted or changed by the flight crew. Alternatively, condition object 54 could be configured to be automatically populated and only serve to communicate the relevant information to the flight crew.

In various embodiments, aircraft condition 38A could be input by the flight crew or could be determined by computer 26 based on data available to computer 26 with or without input from the flight crew. For example, a determination of whether the aircraft 10 is about to conduct a first flight or a subsequent flight within a 24-hour period could be determined based on a sequence of detected weight-on-wheels (WOW) and/or weight-off-wheels (WOFFW) signals, or, a sequence of detected aircraft door openings/closings within that 24-hour period as being indicative of the number flights that the aircraft 10 has conducted in that same period.

In the exemplary embodiment of FIG. 6, condition object 54 indicates "FIRST FLIGHT" which corresponds to all functional tests being selected. The identification of the applicable test objects 44 is achieved by enclosure 52 surrounding all of test objects 44 but it is understood that other identification methods could be used. Condition object 54 can be a pull-down menu with which the flight crew can select the applicable aircraft condition 38A (see FIG. 2) using cursor 46. Upon selection of the applicable aircraft condition 38A, enclosure 52 can be adjusted to surround and identify test objects 44 that are associated with the functional tests that are selected based on aircraft condition 38A.

The selection of the applicable functional tests can be performed by computer 26 using functional test data 41 (see FIG. 2) for example.

In some embodiments, the initiation of the selected functional tests can be triggered automatically based on aircraft condition 38A and without input from the flight crew. Alternatively, the initiation of the selected functional tests can be triggered based on input from the flight crew. In some embodiments, display area 16A can include execution object 56 (e.g., RUN button) that is responsive to user input and that is configured to permit the flight crew to trigger an automatic initiation of some (e.g., a plurality) or all of the selected functional tests. For example, execution object 56 can include a button, icon and/or any other objects suitable for use in graphical user interfaces. In some embodiments, execution object 56 can be actuated by the flight crew using cursor 46 in order to trigger the initiation of the functional tests that have been selected based on aircraft condition 38A. After triggering, the initiation of the applicable selected functional tests can be performed automatically or semi-automatically based on testing order data 42. Depending on the nature of the selected functional tests, some selected functional tests may be executed in parallel while other selected functional tests may need to be executed serially as defined in testing order data 42. The initiation of the selected functional tests according to testing order data 42 can be performed by computer 26 so that the flight crew does not have to be preoccupied with proper sequencing of the selected functional tests. Functional testing page 16A shown in FIG. 6 shows three selected functional tests, namely WXR, TAWS and WING A/ICE, being executed simultaneously in parallel. The simultaneous execution of the three selected functional tests is indicated by status indicators 50 indicating "IN PROG".

Figure 7:
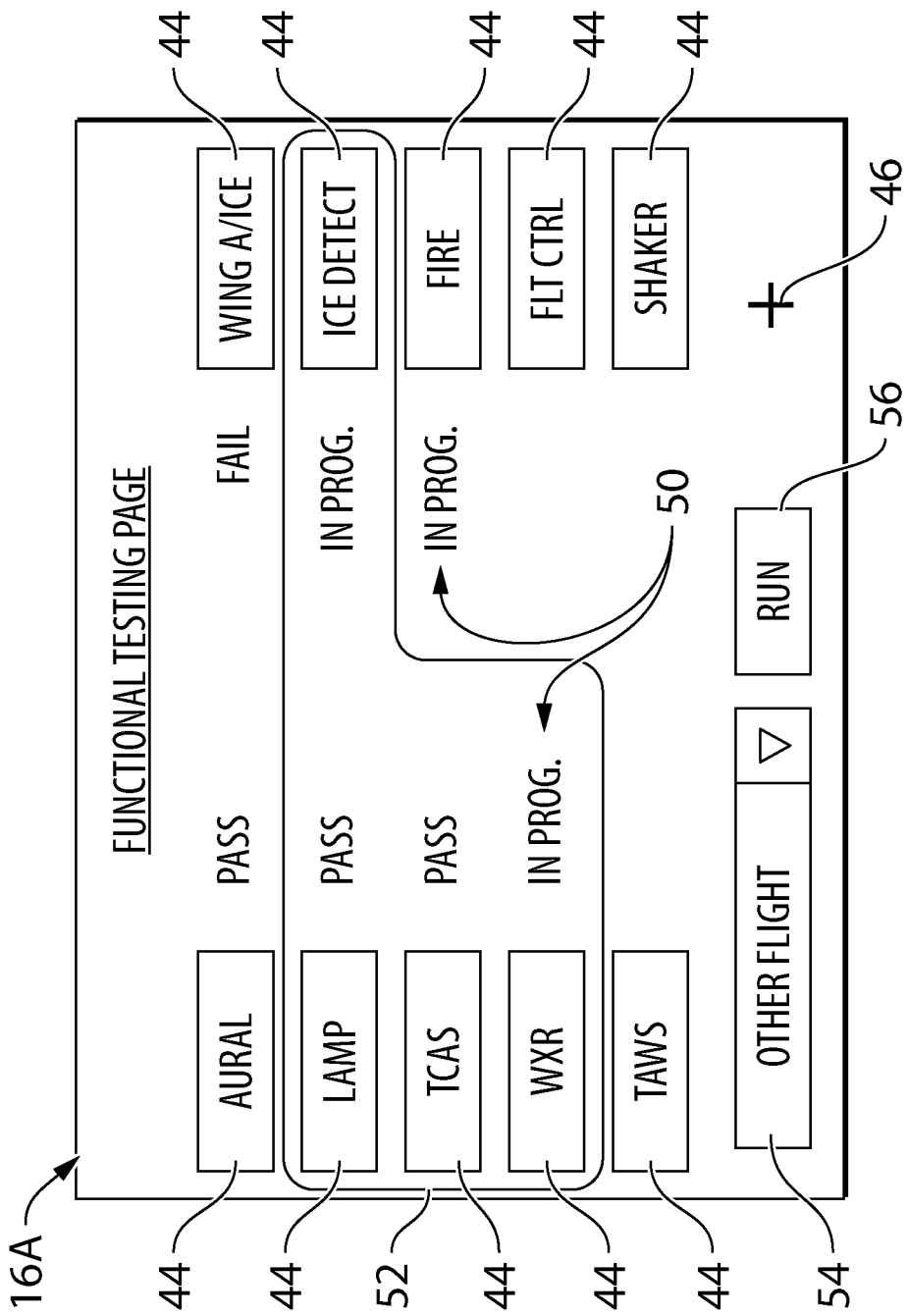
FIG. 7 shows another exemplary functional testing page for displaying on a display device of the apparatus of FIG. 2.

FIG. 7 shows another exemplary functional testing page 16A that can be displayed on display device 14 of apparatus 24. The operation of functional testing page 16A of FIG. 7 can be similar to that of FIG. 6. However, in contrast with the embodiment of FIG. 6, the embodiment of FIG. 7 includes condition object 54 indicating "OTHER FLIGHT" which corresponds to an aircraft condition 38A that requires a reduced number of functional tests. The identification of the applicable test objects 44 is achieved by enclosure 52 surrounding a reduced number of identified test objects 44.

The identified test objects 44 can be a subset of all test objects 44 displayed on functional testing page 16A. Even though the identified test objects 44 can be associated with the selected functional tests applicable to aircraft condition 38A, the non-identified test objects 44 can also be displayed on functional testing page 16A and the associated non-selected functional tests can nevertheless be available to the flight crew. In the embodiment shown in FIG. 7, the actuation of execution object 56 using cursor 46 can trigger the automated initiation of the selected functional tests associated with identified test objects 44 surrounded by enclosure 52. However, the flight crew can still initiate one or more non-selected functional tests by actuating the associated non-identified test objects 44 using cursor 56 if desired.

Functional testing page 16A shown in FIG. 7 shows two selected functional tests (WXR and ICE DETECT) being executed simultaneously in parallel together with a non-selected functional test (FIRE) that was separately initiated by the flight crew via the FIRE test object 44. The simultaneous execution of the three functional tests is indicated by status indicators 50 indicating "IN PROG".

Figure 8:
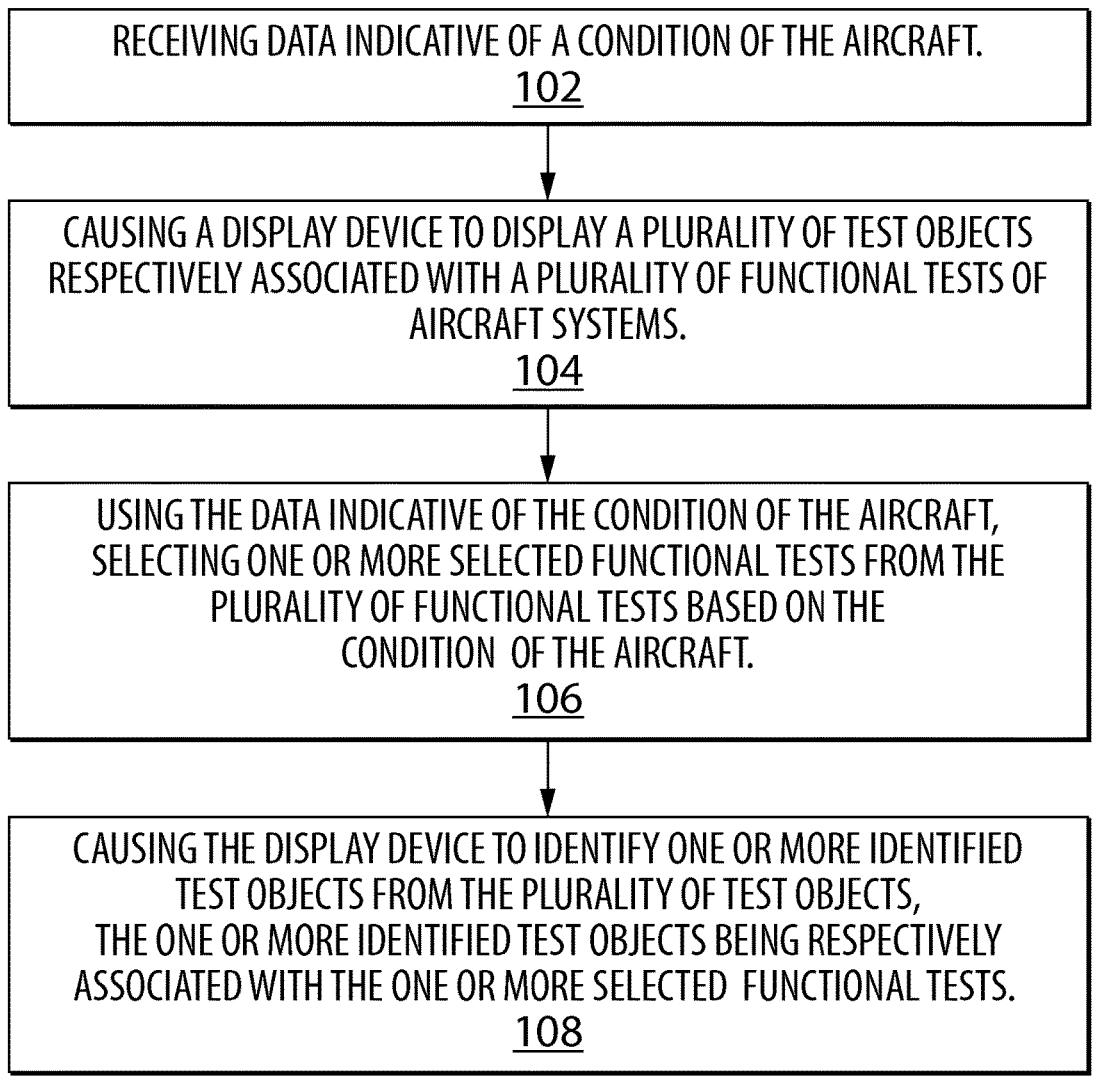
FIG. 8 is a flowchart illustrating an exemplary method for assisting with functional testing of systems of the aircraft of FIG. 1.

FIG. 8 is a flowchart illustrating an exemplary method 100 for assisting with functional testing of systems 36 of aircraft 10. Method 100 can be performed using apparatus 24 as described above or using another apparatus. In various embodiments, method 100 can comprise:

receiving data indicative of condition 38A of aircraft 10 (see block 102);

causing display device 14 to display a plurality of test objects 44 respectively associated with a plurality of functional tests of respective systems 36 of aircraft 10 (see block 104);

using the data indicative of condition 38A of aircraft 10, selecting one or more selected functional tests from the plurality of functional tests based on condition 38A of aircraft 10 (see block 106); and causing display device 14 to identify one or more identified test objects 44 from the plurality of test objects 44, the one or more identified test objects 44 being respectively associated with the one or more selected functional tests (see block 108).

Method 100 can comprise causing display device 14 to display the identified test objects 44 according to a predetermined testing order (e.g., based on testing order data 42). Method 100 can comprise initiating a plurality of the selected functional tests according to the predetermined testing order.

Method 100 can comprise causing display device 14 to display condition object 54 indicating aircraft condition 38A. Condition object 54 can be responsive to user input indicative of aircraft condition 38A.

Method 100 can comprise causing display device 14 to display execution object 56 configured to trigger an automated initiation of some (e.g. a plurality) or all of the selected functional tests in response to user input. Method 100 can comprise causing the execution of two or more of the selected functional tests in parallel.

Method 100 can comprise causing display device 14 to display status information (e.g., see status indicators 50) associated with one or more of the test objects 44.

Identifying the one or more test objects 44 can comprise visually distinguishing the one or more identified test objects 44 from any non-identified test objects 44. In some embodiments, identifying the one or more test objects 44 can comprise causing display device 14 to display enclosure 52 that surrounds all identified test objects 44.

One or more of test objects 44 can be responsive to respective user input using cursor 46 for example. Method 100 can comprise, in response to respective user input received at one or more test objects 44, initiate respective one or more functional tests associated with the one or more test objects 44.

In various embodiments, the functional tests of method 100 can be pre-flight functional tests. The data indicative of aircraft condition 38A can be indicative of any of the following: whether a next flight of aircraft 10 is a first flight of a day; whether the next flight of aircraft 10 immediately follows a change in flight crew; and whether the next flight of aircraft 10 immediately follows a cold and dark start of aircraft 10.

Figure 9:
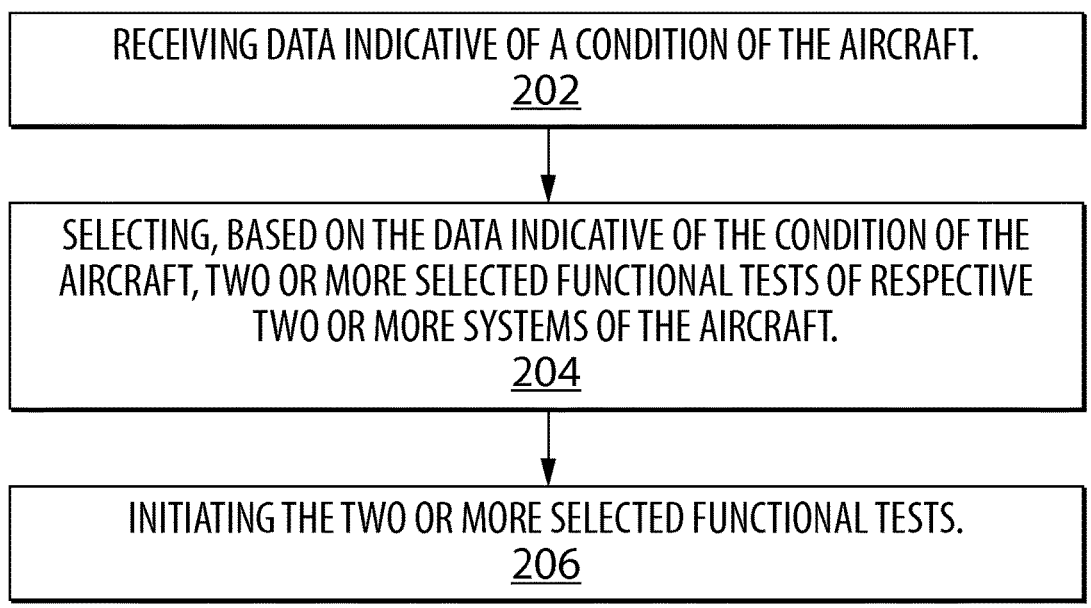
FIG. 9 is a flowchart illustrating another exemplary method for assisting with functional testing of systems of the aircraft of FIG. 1.

FIG. 9 is a flowchart illustrating an exemplary method 200 for assisting with functional testing of systems of aircraft 10. Method 200 can be performed using apparatus 24 as described above or using another apparatus. In various embodiments, method 200 can comprise:

receiving data indicative of condition 38A of aircraft 10 (see block 202);

selecting, based on the data indicative of condition 38A of aircraft 10, two or more selected functional tests of respective two or more systems 36 of aircraft 10 (see block 204); and initiating the two or more selected functional tests (see block 206).

Method 200 can comprise initiating the two or more selected functional tests according to a predetermined testing order (e.g., based on testing order data 42).

Method 200 can comprise causing display device 14 to display execution object 56 configured to trigger an automated initiation of some (e.g., a plurality) or all of the selected functional tests in response to user input.

Method 200 can comprise causing display device 14 to display condition object 54 indicating aircraft condition 38A. Condition object 54 can be responsive to user input that indicative of aircraft condition 38A.

Method 200 can comprise causing an execution of at least two of the selected functional tests in parallel.

In various embodiments, the functional tests of method 200 can be pre-flight functional tests. The data indicative of aircraft condition 38A can be indicative of any of the following: whether a next flight of aircraft 10 is a first flight of a day; whether the next flight of aircraft 10 immediately follows a change in flight crew; and whether the next flight of aircraft 10 immediately follows a cold and dark start of aircraft 10.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for assisting with functional testing of systems of an aircraft, the apparatus comprising:
a display device;
one or more data processors operatively coupled to the display device; and
non-transitory machine-readable memory operatively coupled to the one or more data processors, storing instructions executable by the one or more data processors and configured to cause the one or more data processors to:
generate an output for causing the display device to display a plurality of test objects respectively associated with a plurality of functional tests of respective systems of the aircraft;
using data indicative of a condition of the aircraft, select a plurality of selected functional tests from the plurality of functional tests based on the condition of the aircraft, wherein the data indicative of the condition of the aircraft is indicative of at least one of:
whether a next flight of the aircraft is a first flight of a day; and
whether the next flight of the aircraft immediately follows a change in flight crew;
generate an output for causing the display device to identify one or more identified test objects from the plurality of test objects, the one or more identified test objects being respectively associated with the plurality of selected functional tests;
generate an output for causing the display device to display an enclosure surrounding all of the identified test objects that are associated with the plurality of selected functional tests selected based on the condition of the aircraft, wherein:
non-identified test objects unselected based on the condition of the aircraft are displayed outside of the enclosure and are available for selection; and
the identified test objects and the non-identified test objects are displayed within a same functional testing page of the display device; and
in response to an actuation of an execution object, trigger automated initiation of the plurality of selected functional tests associated with the identified test objects surrounded by the enclosure.

2. The apparatus as defined in claim 1, wherein:
the non-transitory machine-readable memory contains data indicative of a predefined testing order for the plurality of selected functional tests; and
the instructions are configured to cause the one or more data processors to generate an output for causing the display device to display the identified test objects according to the predefined testing order.

3. The apparatus as defined in claim 2, wherein the instructions are configured to cause the one or more data processors to generate an output for initiating the plurality of selected functional tests according to the predefined testing order.

4. The apparatus as defined in claim 1, wherein the instructions are configured to cause the one or more data processors to generate an output for causing the display device to display a condition object indicating the condition of the aircraft.

5. The apparatus as defined in claim 4, wherein the condition object is responsive to user input indicative of the condition of the aircraft.

6. The apparatus as defined in claim 1, wherein the instructions are configured to cause the one or more data processors to generate an output for causing the display device to display the execution object responsive to user input.

7. The apparatus as defined in claim 1, wherein the instructions are configured to cause the one or more data processors to generate an output for causing an execution of two or more of the plurality of selected functional tests in parallel.

8. The apparatus as defined in claim 1, wherein the instructions are configured to cause the one or more data processors to generate an output for causing the display device to display status information associated with one or more of the plurality of test objects.

9. The apparatus as defined in claim 1, wherein identifying the one or more identified test objects comprises visually distinguishing the one or more identified test objects from any non-identified test objects.

10. The apparatus as defined in claim 1, wherein:
one or more of the plurality of test objects are responsive to respective user input; and
the instructions are configured to, in response to the respective user input, cause the one or more data processors to generate an output for initiating the respective one or more of the plurality of selected functional tests associated with the one or more of the plurality of test objects responsive to respective user input.

11. The apparatus as defined in claim 1, wherein the plurality of functional tests are pre-flight functional tests.

12. An aircraft comprising the apparatus as defined in claim 1.

13. A computer-implemented method for assisting with functional testing of systems of an aircraft, the method comprising:
   receiving data indicative of a condition of the aircraft;
   causing a display device to display a plurality of test objects respectively associated with a plurality of functional tests of respective systems of the aircraft;
   using the data indicative of the condition of the aircraft, selecting a plurality of selected functional tests from the plurality of functional tests based on the condition of the aircraft, wherein the data indicative of the condition of the aircraft is indicative of at least one of:
      whether a next flight of the aircraft is a first flight of a day; and
      whether the next flight of the aircraft immediately follows a change in flight crew;
   causing the display device to identify one or more identified test objects from the plurality of test objects, the one or more identified test objects being respectively associated with the plurality of selected functional tests;
   causing the display device to display an enclosure surrounding all of the identified test objects that are associated with the plurality of selected functional tests selected based on the condition of the aircraft, wherein:
      non-identified test objects unselected based on the condition of the aircraft are displayed outside of the enclosure and are available for selection; and
      the identified test objects and the non-identified test objects are displayed within a same functional testing page of the display device; and
   in response to an actuation of an execution object, trigger automated initiation of the plurality of selected functional tests associated with the identified test objects surrounded by the enclosure.

14. The method as defined in claim 13, comprising causing the display device to display the identified test objects according to a predetermined testing order.

15. The method as defined in claim 14, comprising initiating the plurality of selected functional tests according to the predetermined testing order.

16. The method as defined in claim 13, comprising causing the display device to display a condition object indicating the condition of the aircraft.

17. The method as defined in claim 16, wherein the condition object is responsive to user input indicative of the condition of the aircraft.

18. The method as defined in claim 13, comprising causing the display device to display the execution object responsive to user input.

19. The method as defined in claim 13, comprising causing an execution of two or more of the plurality of selected functional tests in parallel.

* * * * *